United States Patent [19]

Connole et al.

[11] Patent Number: 5,306,867

[45] Date of Patent: Apr. 26, 1994

[54] CABLES WHICH INCLUDE WATERBLOCKING PROVISIONS

[75] Inventors: Kent B. Connole, Gahanna, Ohio; Richard S. Cuprak, Tempe; Myles H. Grunewald, Phoenix, both of Ariz.; David M. Mitchell, Decatur, Ga.; Gabriel P. Pellicciotti, Phoenix; Albert S. Tingley, Glendale, both of Ariz.

[73] Assignee: AT&T Bell Laboratories, Murray Hill, N.J.

[21] Appl. No.: 938,095

[22] Filed: Aug. 31, 1992

[51] Int. Cl.$^5$ .............................................. H01B 7/28
[52] U.S. Cl. ................................ 174/23 R; 174/23 C; 523/173
[58] Field of Search ................. 174/22 R, 23 R, 23 C; 523/173

[56] References Cited

U.S. PATENT DOCUMENTS

| | | | |
|---|---|---|---|
| 3,767,454 | 10/1973 | Franke, Jr. et al. | 174/23 R X |
| 4,004,077 | 1/1977 | Woytiuk | 174/23 C |
| 4,176,240 | 11/1979 | Sabia | 174/23 C |
| 4,259,540 | 3/1981 | Sabia | 174/23 C |
| 4,361,507 | 11/1982 | Bourland | 523/173 |
| 4,509,821 | 4/1985 | Stenger | 174/23 C X |
| 4,563,540 | 1/1986 | Bohannon, Jr. et al. | 174/23 R |
| 4,617,422 | 10/1986 | Hagger | 174/23 C |
| 4,701,016 | 10/1987 | Gartside, III et al. | 174/70 R X |
| 4,709,982 | 12/1987 | Corne et al. | 174/23 R X |
| 4,724,277 | 2/1988 | Hindman et al. | 174/23 C |
| 4,870,117 | 2/1989 | Levy | 523/173 |

FOREIGN PATENT DOCUMENTS 9012406 10/1990 PCT Int'l Appl.

OTHER PUBLICATIONS

Pierce, D.; A Truly "Waterproof" Outside Plant Cable?; Outside Plant; May, 1992.

Primary Examiner—Morris H. Nimmo
Attorney, Agent, or Firm—Edward W. Somers; Donald E. Hayes, Jr.

[57] ABSTRACT

A cable (20) includes a plurality of conductors (24) included in a core (22) enclosed in a sheath system. Voids between the conductors are filled by a mixture of a filling composition characterized by a styrene-rubber block copolymer having a styrene/rubber ratio of from 0.2 to 0.5, an ASTM Type 104A oil and polyethylene and a superabsorbent polymer material. The mixture has a viscosity in the range of about 400 cps at 88° C. to 11 cps at 110° C. and may be used to fill substantially voids in a cable comprising as many as 3000 pairs of insulated metallic conductors. The superabsorbent polymer is incorporated into the gel composition in a concentration of about 10 parts by weight to per 100 parts by weight of the filling mixture. A flooding material which comprises a mixture of a flooding composition and a superabsorbent polymer may be used to flood voids between layers of the sheath system.

13 Claims, 2 Drawing Sheets

CABLES WHICH INCLUDE WATERBLOCKING PROVISIONS

TECHNICAL FIELD

This invention relates to a cable which includes waterblocking provisions. More particularly, this invention relates to a communications cable which includes core filling and sheath flooding compositions of matter to protect conductors of the cable from water.

BACKGROUND OF THE INVENTION

Cable used in the telecommunications industry, such as in telephone systems, generally requires a waterblocking material in the cable to protect the cable from water entry and/or from the longitudinal travel of water along the cable. This is true whether the cable is buried beneath the ground or laid under water. It is also sometimes required in aerial applications.

Attempts to waterproof cable such as buried cable began nearly 100 years ago and were unsuccessful in a practical sense until the introduction of plastic insulated cable during the 1950's. Specially sheathed cables, with an inner plastic jacket, aluminum and steel shield metals and an outer plastic jacket, have been used successfully. Pressurized cable also contends successfully with water problems. However, both of these approaches are deficient, the former leaves the cable vulnerable and the latter is expensive to maintain and subjects the cable to critical exposure in the event of failure of the pressurization system.

Since 1970, large quantities of cable have been filled with waterproofing compounds. This approach followed the recognition that in plastic insulated cable, the localized intrusion of water into the cable sheath is not in itself a serious problem. Disruption or deterioration of service occurs when long lengths of cable become flooded. Flooding occurs because water that penetrates into a localized opening in the cable sheath is free to channel as far as gravity allows, often hundreds of feet. Not only does this upset the capacitance balance of the transmission lines, but it introduces more potential corrosion sites in proportion to the length of wire that is wetted. Corrosion typically occurs slowly, but the useful life of water soaked wires is obviously shorter than that of dry wires.

A solution that has been widely adopted is to fill the voids in the cable with a water insoluble filling material that simply plugs the cable to channeling water. However, though the physical function of the cable filling material is straightforward, the choice of the material is not. Among the many considerations that are important for materials used in this application are the hydrophobic nature of the material, stability on aging, low temperature properties, flow characteristics at elevated temperatures, processing characteristics, handling characteristics, dielectric properties, toxicity and cost.

Materials that satisfy most of these criteria, and which have been used widely in this application, are described in U.S. Pat. Nos. 3,607,487 and 3,717,716 issued Sep. 21, 1971 and Feb. 20, 1973, respectively. These materials are essentially a petroleum jelly mixed with a polymer, usually polyethylene, to impart consistency and prevent flowing at warm temperatures.

Similar hydrophobic filling materials have been proposed for filling splice closures. For example, U.S. Pat. No. 3,879,575 issued Apr. 22, 1975 describes a mixture of a low viscosity oil, gelled by a styrene-isoprenestyrene copolymer, again with a polyethylene wax added to impart consistency and reduce slump.

More recently, an improvement over the petroleum jelly-polyethylene wax cable filling material has been disclosed in U.S. Pat. No. 4,259,540 issued Mar. 31, 1981 in the name of R. A. Sabia. This patent discloses a material which overcomes the objectionable handling characteristics of the petroleum jelly-polyethylene cable filling material. For example, because installation and maintenance of cables often requires the cable to be spliced, such splicing generally requires the isolation and removal of filling material from individual wires or optical fibers in the splice region where the cables are filled with the petroleum jelly material. Otherwise, an oily interface may form between the wire and the polyurethane material subsequently used to encapsulate the splice. This oily interface which can serve as a path for water entry into the splice can result in service-affecting trouble. Moreover, removing just sufficient material to effect the splice is time consuming and the task is generally undesirable. Further, handling at low temperatures is significantly more difficult, necessitating on occasion use of a torch to preheat the cable or the use of solvents to soften the encapsulated core. The improved material described in U.S. Pat. No. 4,259,540 overcomes the aforementioned objections to the cable filled with the petroleum jelly-polyethylene material. The improved material according to the patent is a mixture of a naphthenic or paraffinic oil having specific characteristics, a styrene-ethylene butylene-styrene (S-EB-S) triblock copolymer having a styrene-rubber ratio of from about 0.2 to 0.5 and polyethylene having a softening point of 110° C. to 130° C. See also U.S. Pat. No. 4,176,240 which issued on Nov. 27, 1979 in the name of R. A. Sabia.

It should be noted that the term styrene-rubber ratio, when used herein, refers to the weight ratio of the styrene block to the rubber block in the copolymer. Further, whenever the term S-EB-S is employed, it refers to a triblock copolymer whereas the term S-EB refers to a diblock copolymer.

Whereas the cable filling material of U.S. Pat. No. 4,259,540 has proved to be excellent in blocking the flow of water in a cable, it alone may not be completely suitable in meeting newly established standards for waterblocking. These standards set forth that there shall be no flow of water through an eight-foot length of cable when the length of cable is subjected to a twelve (12) foot head of water for twenty-four hours.

The patent literature also describes cables including water swellable polymers such as polyvinyl alcohol, polyacrylamides, or cellulose derivatives, which are applied to bundle wrappings or contained in moisture barriers which are spaced along the length of the cable outside of the conductor bundles and between portions of a sheath system. The area outside the core and the between portions of the sheath system is referred to as the flooding zone.

Such cables are, however, characterized by certain disadvantages and limitations. In the case of those which include one of the above-described water swellable polymers, the polymer is generally supplied in powdered or granular form. If not distributed throughout the cable core, effective water absorbence is not assured throughout that zone. The powder may be included in a tape laminate which extends longitudinally along the cable.

Using lower concentrations of the powder in the filling material compromises the water blockage capabilities of the filling material. Further, certain swelling agents such as polyvinyl alcohols and polyacrylamides do not swell quickly enough in cold water to effect proper water blockage when a cable core is only partially filled whereas filling the core completely with such agents is prohibitively expensive and causes problems with swelling in the confined space when contacted by water.

More recently, in PCT/US 90/01863 having an international publication number WO 90/12406 is disclosed a gel composition which can be used as both a filling and or an encapsulating compound. The composition is comprised of a fluid, a thickener for mixing with the fluid to form a gel matrix, and a water absorbent polymer having anionic groups attached to the polymeric backbone which is generally supplied in the form of a fine powder. This powdered hydrocarbon polymer is mixed with the dielectric gel matrix. In many cases, the dielectric gel matrix is hydrophobic and the addition of a supplementary hydrophilic substance is beneficial.

The gel composition itself provides an initial barrier to the entry of water into the confined space in which the gel is located. If water does enter the space, whether the space is the inside of a fiber optic cable, a housing or splice, or the filling or flooding zone of a telecommunications cable, the water absorbent polymer in the gel is activated and the water is absorbed. Once the water is contacted by the polymer in the gel, a highly viscous semi-solid material forms that, depending on the viscosity of the gel composition, is incapable of fluid movement.

The gel composition of the above-identified PCT document therefore plays several roles in protecting the contents or components of a confined space such as a housing or cable from water damage. First, if there is invasive moisture, the gel composition repels the water. Additionally, in the presence of water, the water absorbent polymer of the gel is activated to absorb the water, preventing its further migration.

In the PCT disclosure, it is generally preferred that the viscosity range of the gel is from about 2 centistokes at 100° C. to about 90,000 centistokes at 40° C. The viscosity of the composition in the PCT document must be relatively high judging from the inclusion of thickeners. Also, such relatively high viscosity should be evident from the manner of use to fill cables. The gel composition of the foregoing PCT document apparently is used to fill cables in the 20 conductor pair range. Cables today may include 3000 or more conductor pairs. Of course, a plurality of 20 pair units each could be filled and then the units assembled in a very large conductor pair size cable. However, this technique does not result in all the interstices, particularly those between the units, being filled.

What is needed and what seemingly is not available is a large conductor pair size cable which includes a waterblocking material which fills the interstices in the core and a flooding material which floods between layers of a sheath system of the cable to preserve the electrical characteristics of the cable under new waterblocking requirements. More particularly, the sought-after cable should include waterblocking compositions which not only are suitable for filling and flooding but which also may be applied in a manufacturing line on which the cable is made.

SUMMARY OF THE INVENTION

The foregoing problems of the prior art have been overcome by the cable of this invention. A cable includes a core comprising a plurality of insulated metallic conductor pairs having a plurality of longitudinally extending transmission media and a waterblocking material. Advantageously, the waterblocking material is disposed in interstices among the transmission media. The waterblocking material is a mixture comprising a filling composition and a superabsorbent polymer. The filling composition includes a styrene-rubber block copolymer, a compatible oil and polyethylene in proportions to provide a cable filling composition. The superabsorbent polymer is included in an amount no greater than about 10 parts by weight per 100 parts by weight of the waterblocking mixture. Desirably, the viscosity of the mixture is such that a cable core comprising as many as 3000 metallic conductor pairs may be filled on a manufacturing line with said waterblocking material, said cable being characterized by a dissipation factor of $10^{-4}$ microradian and a dielectric constant less than about 2.3.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
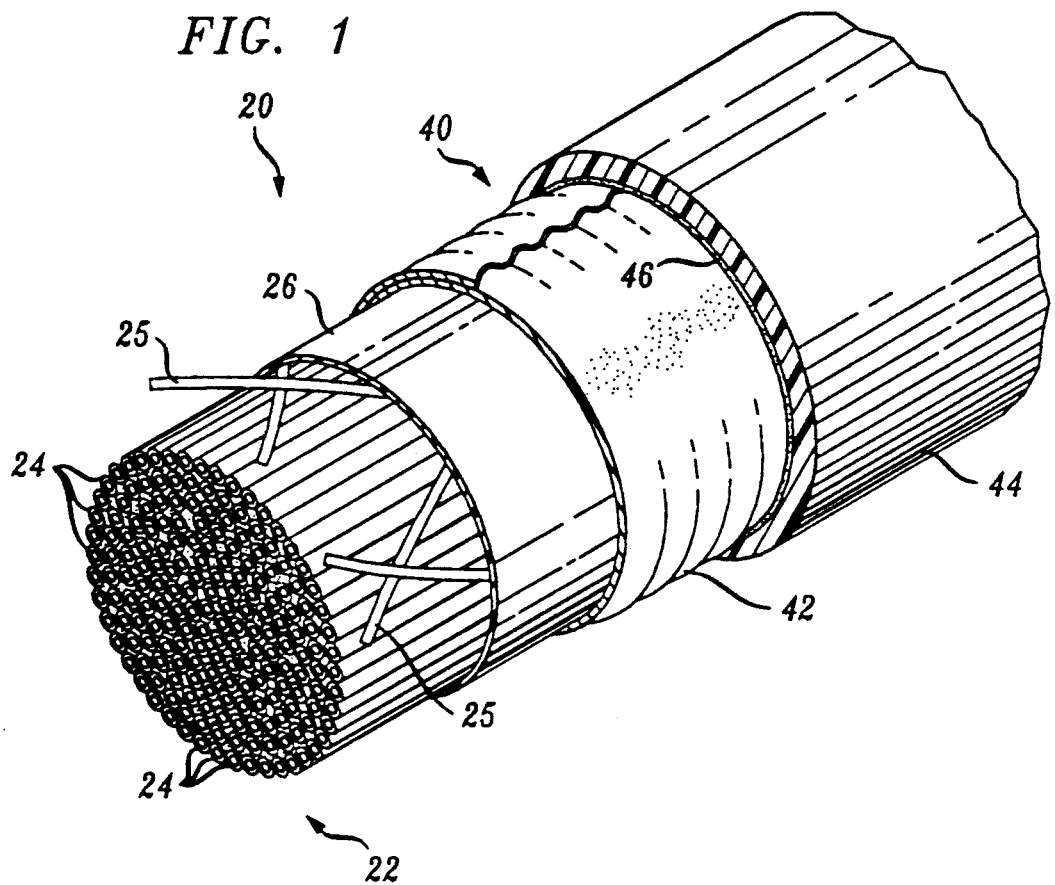
FIG. 1 is a perspective view of a cable which includes a filling mixture in a core thereof and a flooding composition to seal portions of the cable between layers of a sheath system.
Figure 2:
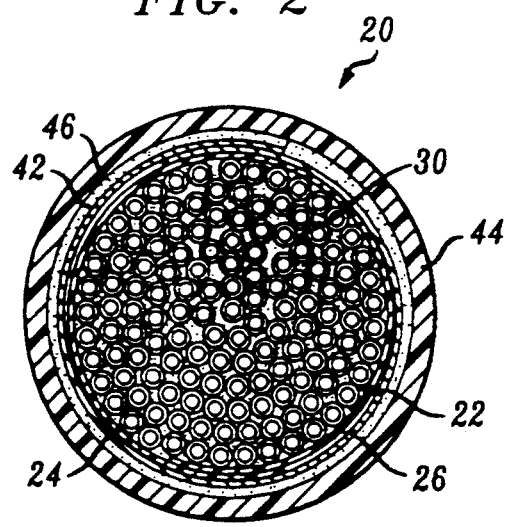
FIG. 2 is an end view of the cable of FIG. 1.

Referring now to FIGS. 1 and 2, there is shown a cable, which is designated generally by the numeral 20, and which includes a core 22 having a plurality of insulated metallic conductor pairs 24—24. The conductors may be grouped together in units and the units assembled together into the core 22. Binders 25—25 are used to bind together the conductors. The core 22 is disposed within a plastic material 26 which is wrapped thereabout and which commonly is referred to as the core wrap. Typically, the core wrap is made of a plastic material such as polyethylene terephthalate.

The core 22 is filled with a mixture 30 which includes a filling composition of matter which typically is referred to as a filling material or filling composition. The mixture comprises a filling composition referred to as FLEXGEL filling composition and a superabsorbent polymer in powder form. FLEXGEL filling compositions are described in U.S. Pat. No. 4,176,240 which has been previously mentioned and which is incorporated by reference hereinto.

About the core 22 is disposed a sheath system 40. The sheath system may include a corrugated metallic layer 42 and a plastic jacket 44. A flooding material 46 may be disposed between layers of the sheath system such as between the core wrap 26 and the metallic layer 42 and/or between the metallic layer and the jacket 44.

The FLEXGEL filling composition comprises an extender oil type 104B per ASTM D 2226 such as Sunpar LW 120 marketed by the Sun Refining and Marketing Company. The oil extender is included in the amount of 88.5 to 89.5 parts by weight. Also included is a styrene-rubber block copolymer in the amount of 5.4 to 5.6 parts by weight. A suitable rubber is a triblock designated Kraton G 1652 marketed by the Shell Chemical Company. The filling composition includes about 4.9 to 5.1 parts by weight of polyethylene. A suitable polyethylene is one designated AC-9 or AC-9A as marketed by the Allied Signal Company. A compatibilizer in the amount of 0.4 to 0.6 part by weight and an antioxidant in the amount of 1 part by weight are included. A suitable compatibilizer is Kronitex 100 marketed by the FMC Corporation whereas a suitable antioxidant is Irganox 1035 marketed by the Ciba-Geigy corporation. One preferred composition includes 89.0 parts by weight of the extender oil, 5.5 parts by weight of rubber, 5 parts by weight of polyethylene, 0.5 part by weight of the compatibilizer and 1 part by weight of Irganox 1035 stabilizer.

It is important that the material have a proper viscosity. The filling process is carried out at elevated temperature. From the standpoint of the processing equipment and the effectiveness of the filling process, it is more desirable to lower the viscosity of filling material than to raise the temperature. The operating temperature is limited to the vicinity of 110° C. by the material commonly used to insulate the conductors. Therefore further variation is obtained by choice of the composition. A suitable range is 400 cps at 88° C. to 11 cps at 110° C. The second criterion is the slump characteristics after two hours exposure to three temperatures, 50°, 60° and 70° C. This measures the retention of the filling material in an acceptably rigid state at elevated service temperatures. Mechanical properties of the filling composition indicated were found to be adequate in nearly every case. The mechanical characteristics of the materials can be summarized in a subjective manner that is perhaps more meaningful. The prior art petroleum jelly material is a grease-like substance whereas the materials described here have a consistency resembling a soft gum eraser.

An important physical property of the material is its handleability. This property was evaluated subjectively and was one basis for choosing the styrene ethylene-butylene-styrene block copolymer. Another is flow at elevated temperatures and is the basis for choosing composition limits.

The superabsorbent powder which is mixed with the FLEXGEL filling composition may be an ARIDALL TM 1125-J superabsorbent polymer, as marketed by the Chemdal Corporation. The mixture of the filling composition and superabsorbent polymer is such that the superabsorbent polymer is included in the amount of up to about 10 parts by weight per 100 parts by weight of the mixture.

ARIDALL polymers are crosslinked acrylics in a class of products commonly referred to as superabsorbents. This classification also includes starch-graft polymers, crosslinked glycolate and cellulose ethers. Of these types, the crosslinked acrylics are rapidly becoming the most popular of the superabsorbents. ARIDALL polymers combine the advantages of high absorbent capacity and suitable gel stiffness, making them ideal absorbent media for a wide range of personal care and medical disposables.

Like all acrylic-based superabsorbents, ARIDALL polymers derive absorbency from carboxylate groups located on the spine of the polymer. When an aqueous medium contacts the polymer, the carboxylate groups solvate rapidly and develop mutually repulsive negative charges. This causes the polymer to uncoil and absorb the medium to many times its weight. Crosslinking prevents solution of the polymer. The medium quickly becomes oriented on the polymer's surface by virtue of hydrogen bonding. The resulting gel has a remarkable ability to hold water even under pressure. ARIDALL polymers hold fluids by a physio-chemical mechanism.

The foregoing superabsorbent polymer material has an absorption capacity of 35 g/g saline, a moisture content of 6±2%, 600 ppm max. residual acrylate monomer, a pH (0.1% solids) of 7±0.3 and a particle size distribution of 100–1000 micron.

Another suitable superabsorbent polymer is one marketed by Absorbent Technologies, Inc., and designated Aqua Keep J-550 superabsorbent polymer. The latter has a capacity (0.9% saline) of 65 ml/g, a retention (0.5 psi) of 43 ml/g, a pH of 7.5 and a residual monomer of 75 ppm and a particle size distribution of 32 to 200 mesh with 3.7% passing the 200 mesh.

Another FLEXGEL filling material which is suitable is one comprising 77.5 to 78.5 parts by weight of an extender oil Type 104B per ASTM D 2226. A suitable extender oil is the previously mentioned SUNPAR LW 120. Included also are 3.9 to 4.1 parts by weight of KRATON G-1726 styrene-rubber diblock copolymer and 0.9 to 1.1 parts by weight of KRATON G1652 styrene-rubber triblock copolymer, both of which are available from the Shell Chemical Company. A polyethylene in an amount of 6.9 to 7.1 parts by weight, a polybutene in amount of 9.8 to 10.2 and 1 part by weight of antioxidant also are included. The polybutene may be one designated H-300 and marketed by the Amoco Chemical Company. The polyethylene preferably is the previously mentioned AC-9 or AC-9A whereas the antioxidant is Irganox 1035. See previously mentioned U.S. Pat. No. 4,259,540 which is incorporated by reference hereinto.

Still another filling composition employs a styrene-rubber diblock copolymer to replace all or part of the styrene-rubber-styrene triblock copolymer and is disclosed in U.S. Pat. No. 4,870,117 which issued on Sep. 26, 1989 in the names of A. C. Levy and C. F. Tu and which is incorporated by reference hereinto. The composition includes about 80 to 87 parts by weight of an extender oil, type 104B per ASTM D 2226. A suitable extender oil is one available from the Sun Refining and Marketing Company under the designation Sunpar LW110. Two styrene-rubber block copolymer constituents are included, one being Kraton G1726 in the amount of 0.4 to 0.6 part by weight and the other being Kraton G 1652 in the amount of 4.9 to 5.1 parts by weight both marketed by the Shell Chemical Company. Also included are 6.9 to 7.1 parts by weight of AC-9 or AC-9A polyethyelene as marketed by the Allied-Signal Company and 6.9 to 7.1 parts by weight of H-300 polybutene marketed by the Amoco Chemical Company. An antioxidant in the amount of 1 part by weight is included, it preferably being Irganox 1035 marketed by Ciba-Geigy Corporation.

The prior art triblock rubber molecule is capped on both ends by styrene. The material has a higher pseudo-crosslink density than the styrene-rubber diblock copolymer used in the filling composition wherein the rubber has a styrene cap on one end only. The crosslinks are physical in nature because they are not present in the melt and result from separate styrene and rubber block domains which form due to the inherent incompatibility of the two types of blocks. Inasmuch as the styrene blocks are rigid below their glass transition temperature, $T_g$, of approximately 90° C., they act as physical crosslinks below the styrene $T_g$ where the styrene block is on both ends of the molecule (triblock). This lower physical crosslink density causes the oil, which is incorporated in the composition, to be more effectively gelled. Accordingly, syneresis (separation) and cell filling of foamed insulation are significantly reduced or eliminated.

Further, one may select a styrene-rubber diblock copolymer which is approximately half the molecular weight of the prior styrene-rubber-styrene copolymer, but having approximately the same styrene block to rubber block ratio. A lower viscosity material makes it possible to add polybutene oil and polyethylene wax to the filling composition to aid in preventing insulation cell filling and in improving high temperature flow characteristics. Such a lower viscosity material can be obtained by using a low viscosity processing oil but not without incurring a significant penalty with respect to parameters such as flash point and volatility. If sufficient styrene-rubber copolymer is used, no polybutene oil addition is necessary. However, because the copolymer is generally more costly than the polybutene oil, from an economic standpoint, it is desirable to use a combination of the two material to prevent cell filling of foamed insulation. However, for spliced encapsulant compatibility and the processability of the filling compounds considerations, it is desirable to minimize the polybutene oil level. Hence, depending upon the consideration which is most important to the user, the formulation can be adjusted in various ways. It is apparent that the substitution of the styrene-rubber diblock copolymer for all or part of the styrene-rubber-styrene triblock copolymer of the prior art is extremely desirable. Even low levels of the styrene-rubber diblock copolymer (about 1%) are found to be particularly useful in formulations which require flame-retardant properties where syneresis can be a problem.

Although the use of a diblock copolymer reduces the viscosity, it tends to result in a somewhat greasy material which may not be acceptable to some customers. The increased viscosity is brought on by the triblock copolymer which is used to impart gelness to the filling material. It has been found that a less greasy, reduced viscosity composition can be achieved by reducing the diblock copolymer content and including a lower viscosity oil.

The handleability of the filling compound can be changed by varying the ratio of the diblock copolymer to the triblock copolymer. The higher the diblock copolymer content, the more greasy is the filling compound. On the other hand, a high triblock copolymer content results in a highly gelled filling material. In a preferred embodiment, the ratio by weight percent of the diblock copolymer to the triblock copolymer should be in the range of from about 0.05 to 5.

The viscosity measurement indicates the processability of the material. Cables are filled by injecting the filling material into the voids between the wire pairs. Typically, in copper wire cable, this is done after forming cores consisting of a number of units of wires. Therefore, it is important that the material have a proper viscosity. The filling process involves elevated temperature. From the standpoint of the processing equipment and the effectiveness of the filling process, it is more desirable to lower the viscosity of the filling material than to raise the temperature. The operating temperature is limited to the vicinity of 110° C. by the insulation commonly used. Therefore, further variation is obtained by choice of the composition. A maximum of 60 centipoise at 110° C. has been imposed on the composition for acceptable processing.

It has been found that cables which include 3000 insulated metallic conductor pairs and which have been filled and flooded with the hereinbefore described mixture have successfully passed the BELLCORE 12-foot waterhead test. The test has been passed for a cable which has been filled on the jacketing line with the powder added in a supply chamber adjacent to the line in which the filling material is held at an elevated temperature.

In addition to filling compounds used to block water entry into cable cores, flooding compounds are used to provide a seal against water entry into sheath interfaces and to prevent slipping of the outer, plastic cable jacket during placing operations. One of the superabsorbent polymers listed elsewhere in this Detailed Description can be added to the flooding compound, in the same concentration range as for filling compound, to produce swelling in the presence of water. Waterblocking in the sheath interfaces is thereby enhanced without detriment to the tacticity required for the prevention of jacket slipping.

A superabsorbent polymer also may be mixed with a flooding composition of matter which is an atactic polypropylene or polybutylene, the latter being preferred and available from the Amoco Chemical Company. Herein as in the filling mixture, the superabsorbent powder is included in the amount of as much as 10% by weight of the mixture.

The filling mixture comes into intimate contact with the insulating material of the conductors comprising a cable core. It is important, therefore, that the filling mixture not degrade the electrical or mechanical characteristics of the insulating material. Tests have shown that FLEXGEL compounds containing superabsorbent polymers, listed elsewhere in this Detailed Description, do not cause degradation of those properties. Specifically, tests have shown that the oxidative stability of certain insulating materials remains high following exposure to FLEXGEL filling compounds including superabsorbent polymer at 70° C. for 28 days (the aging criterion in use in the U.S. cable manufacturing industry). Also, the electrical characteristics of cable of this invention are very acceptable. The dielectric constant is less than about 2.3 and the dissipation factor is less than $10^{-4}$ microradian.

Figure 3:
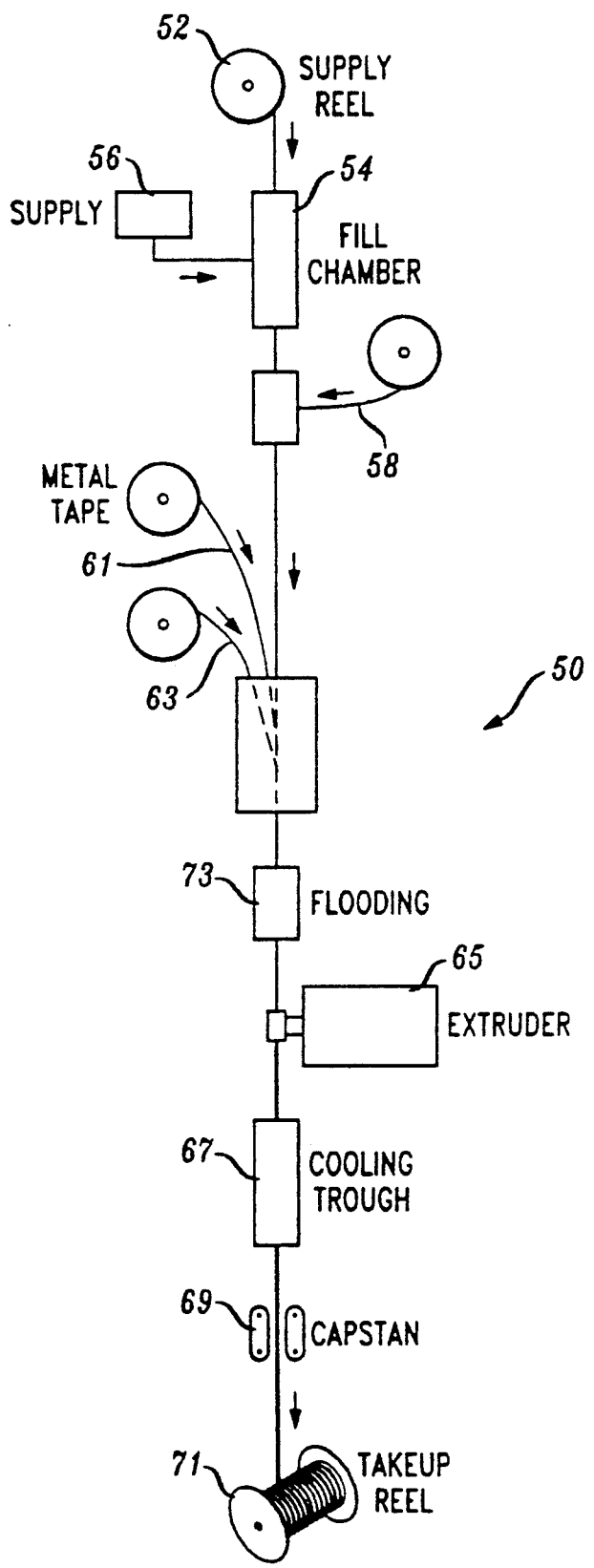
FIG. 3 is a perspective view of a cable filling and sheathing line which fills the core with the filling mixture and floods portions of the cable between layers of the sheath system.

Going now to FIG. 3, there is shown in schematic form a manufacturing line designated generally by the numeral 50 in which a core comprising conductor pairs which have been grouped together into units after which the units have been assembled together into a cable core is provided with a sheath system comprising a jacket. Of course, as mentioned hereinbefore, the cable sheath system includes elements in addition to the jacket.

The core 22 is moved from a core truck 52 through a filling chamber 54. In the filling chamber 54, a mixture of a FLEXGEL filling composition and a superabsorbent powder provided from a supply tank 56 at an elevated temperature of about 100° C. is flowed under pressure to engage the core. The viscosity of the mixture and its temperature are such that the mixture fills substantially the interstices of the core.

The filled core is moved out of the filling chamber and is enclosed with a tape 58 of plastic material such as polyethylene terephthalate plastic material which is wrapped about the filled core. Over the core wrap may be disposed a shielding system which may comprise one or more corrugated metallic layers. For example, an inner layer may comprise corrugated aluminum tape 61 and an outer layer may comprise corrugated steel tape 63. Over the metallic layers, an extruder 65 applies an outer plastic jacket. In some cables, an inner jacket also may be used. The plastic jacketed cable is moved through a cooling trough 67 by a capstan 69 and is then taken up on a reel 71.

Between the foregoing described layers of the sheath system is disposed a flooding material described earlier herein which enhances the waterblocking capabilities of the cable. The flooding material is applied selectively by apparatus 73 between portions of the sheath system.

It is to be understood that the above-described arrangements are simply illustrative of the invention. Other arrangements may be devised by those skilled in the art which will embody the principles of the invention and fall within the spirit and scope thereof.

We claim:

1. A cable, which comprises:
   a plurality of longitudinally extending transmission media; and
   a waterblocking material which comprises a mixture comprising a filling composition which is disposed in interstices among the transmission media, the filling composition including a styrene-rubber block copolymer, a compatible oil and polyethylene in proportions to provide a cable filling composition and a superabsorbent polymer which is included in an amount no greater than about 10 parts by weight per 100 parts by weight of said mixture, the viscosity of the mixture being such that a cable core comprising as many as 3000 metallic conductor pairs as transmission media may be filled with said mixture and said cable characterized by a dissipation factor which is about $10^{-4}$ microradian and a dielectric constant less than about 2.3.

2. The cable of claim 1, wherein said styrene-rubber copolymer has a styrene/rubber ratio of from about 0.2 to 0.5.

3. The cable of claim 1, wherein said filling composition comprises a paraffinic or naphthanic oil or mixtures thereof having a minimum specific gravity of 0.860, a minimum SUS viscosity at 210° F. of 45, a maximum pour point of 20° F. and a maximum of 5 percent aromatic oils, a styrene-ethylene butylene-styrene block copolymer having a styrene-rubber ratio of about 0.2 to 0.5 and polyethylene having a softening point of 110° C. to 130° C.

4. The cable of claim 3 wherein said oil comprises about 88.5 to 89.5 parts by weight of said filling composition, said block copolymer, 5.4 to 5.6 parts by weight and said polyethylene about 4.9 to 5.1 parts by weight.

5. The cable of claim 3, wherein said oil comprises about 77.5 to 78.5 parts by weight of said filling composition, said block copolymer about 0.9 to 1.1 parts by weight of a triblock copolymer and 3.9 to 4.1 parts by weight of a diblock copolymer, said polyethylene about 6.9 to 7.1 parts by weight and said filling composition also including about 9.8 to 10.2 parts by weight of polybutene.

6. The cable of claim 1, wherein the filling composition comprises a mixture of a styrene-rubber diblock copolymer wherein the styrene block comprises a styrene homopolymer, wherein the rubber block comprises a saturated olefin copolymer and wherein said styrene rubber diblock copolymer has a styrene/rubber ratio of from about 0.2 to 0.5.

7. The cable recited in claim 1, wherein said styrene-rubber diblock copolymer is a styrene-ethylene butylene diblock copolymer.

8. The cable recited in claim 7, wherein:
   said oil has a minimum specific gravity of about 0.85, a minimum SUS viscosity at 210° F. of about 40, and a maximum pour point of about 20° F.; and said polyethylene has a softening point of from 110° C. to 130° C.

9. A cable comprising a plurality of conductors contained within a sheath leaving voids between the conductors and/or between the conductors and the sheath and a filling material filling said voids, the invention characterized in that said filling material comprises a mixture of superabsorbent polymer and a filling composition comprising a styrene-rubber diblock copolymer, a compatible oil and polyethylene in proportions to provide a cable filling material having a viscosity which facilitates ease in cable filling and wherein the styrene-rubber diblock copolymer has a styrene-rubber ratio of from about 0.2 to 0.5.

10. A cable comprising a plurality of insulated conductors disposed within a sheath system leaving voids between said conductors and/or between said conductors and said sheath system and a filling material filling said voids, the invention characterized in that said filling material comprises:
   a filling composition comprising:
      a styrene-rubber diblock copolymer having a styrene/rubber ratio of from about 0.2 to 0.5 wherein the styrene block of said diblock copolymer comprises a styrene homopolymer and wherein the rubber block of said diblock copolymer comprises a saturated olefin copolymer;
      a styrene-rubber-styrene triblock copolymer having a styrene/rubber ratio of from about 0.2 to 0.5 wherein the ratio by weight percent of the diblock copolymer to the triblock copolymer is in the range of from about 0.5 to about 5;
      a compatible oil;
      from about 4–12% polyethylene having a softening point of from 110° C. to 130° C. and wherein the filling material is of a viscosity of less than about 60 counterpoise at the filling temperature;
   a superabsorbent polymer comprising no greater than 10 parts by weight per 100 parts by weight of said filling material,
   said cable having a dissipation factor of about $10^{-4}$ microradian and a dielectric constant less than about 2.3.

11. The cable of claim 10, wherein voids formed between portions of said sheath system are filled with a mixture comprising a flooding material and a superabsorbent polymer.

12. The cable of claim 11, wherein said superabsorbent polymer is included in the amount not exceeding 10 parts per weight per 100 parts by weight of said mixture.

13. The cable of claim 11, wherein said flooding material is selected from the group consisting of an active polypropylene and polybutylene.

* * * * *